United States Patent [19]
Hurst

[11] 4,260,569
[45] Apr. 7, 1981

[54] METHOD OF MAKING A FOAMED POLYSTYRENE BUILDING PANEL

[76] Inventor: Aubrey J. Hurst, Rte. No. 3, Mercury Dr., Concord, Tenn. 37720

[21] Appl. No.: 939,044

[22] Filed: Sep. 1, 1978

[51] Int. Cl.³ ............................................. B29D 27/00
[52] U.S. Cl. ................................ 264/45.4; 52/309.11; 264/46.4; 428/83
[58] Field of Search ................. 264/45.4, 46.4, 51, 264/53; 156/79; 52/309.11; 428/83

[56] References Cited

U.S. PATENT DOCUMENTS

| | | | |
|---|---|---|---|
| 2,628,180 | 3/1953 | Iverson | 428/441 X |
| 2,787,809 | 4/1957 | Stastny | 264/53 |
| 2,972,559 | 2/1961 | Allen et al. | 156/79 X |
| 3,042,967 | 7/1962 | Edberg | 264/53 |
| 3,116,349 | 12/1963 | Immel | 264/45.4 |
| 3,159,882 | 12/1964 | Slayter | 52/309.11 X |
| 3,258,889 | 7/1966 | Butcher | 52/65 X |
| 3,605,365 | 9/1971 | Hastings | 264/45.4 X |
| 3,697,633 | 10/1972 | Edgar | 264/45.3 |
| 3,736,715 | 6/1973 | Krumwiede | 52/309.11 |
| 3,785,913 | 1/1974 | Hallamore | 428/83 X |
| 3,925,528 | 12/1975 | Müller et al. | 264/45.4 X |
| 3,935,044 | 1/1976 | Daly | 264/45.4 X |

FOREIGN PATENT DOCUMENTS

| | | | |
|---|---|---|---|
| 1176834 | 8/1964 | Fed. Rep. of Germany | 264/45.4 |
| 2012504 | 3/1970 | France | 264/45.4 |
| 166397 | 3/1959 | Sweden | 264/45.4 |
| 1113389 | 5/1968 | United Kingdom | 264/45.4 |
| 1329094 | 9/1973 | United Kingdom | 264/45.4 |
| 1452101 | 10/1976 | United Kingdom | 264/46.4 |
| 298417 | 5/1971 | U.S.S.R. | 264/45.4 |

*Primary Examiner*—Philip Anderson
*Attorney, Agent, or Firm*—Neil F. Markva

[57] ABSTRACT

The building panel of the invention is made in accordance with a novel process. A plurality of frame members are laterally spaced with respect to each other. A particular process is used to form a dry coating of polystyrene disposed on at least one side of each frame member. The frame members are placed in a mold cavity where styrene beads are placed adjacent the dried coating of polystyrene on each frame member. The styrene beads are then expanded through a heating step thereby causing the molded styrene section formed between the frame members to be integrally bonded or fused to the frame members through the mechanism of the expanding styrene beads fusing with the polystyrene of the dried coating.

8 Claims, 2 Drawing Figures

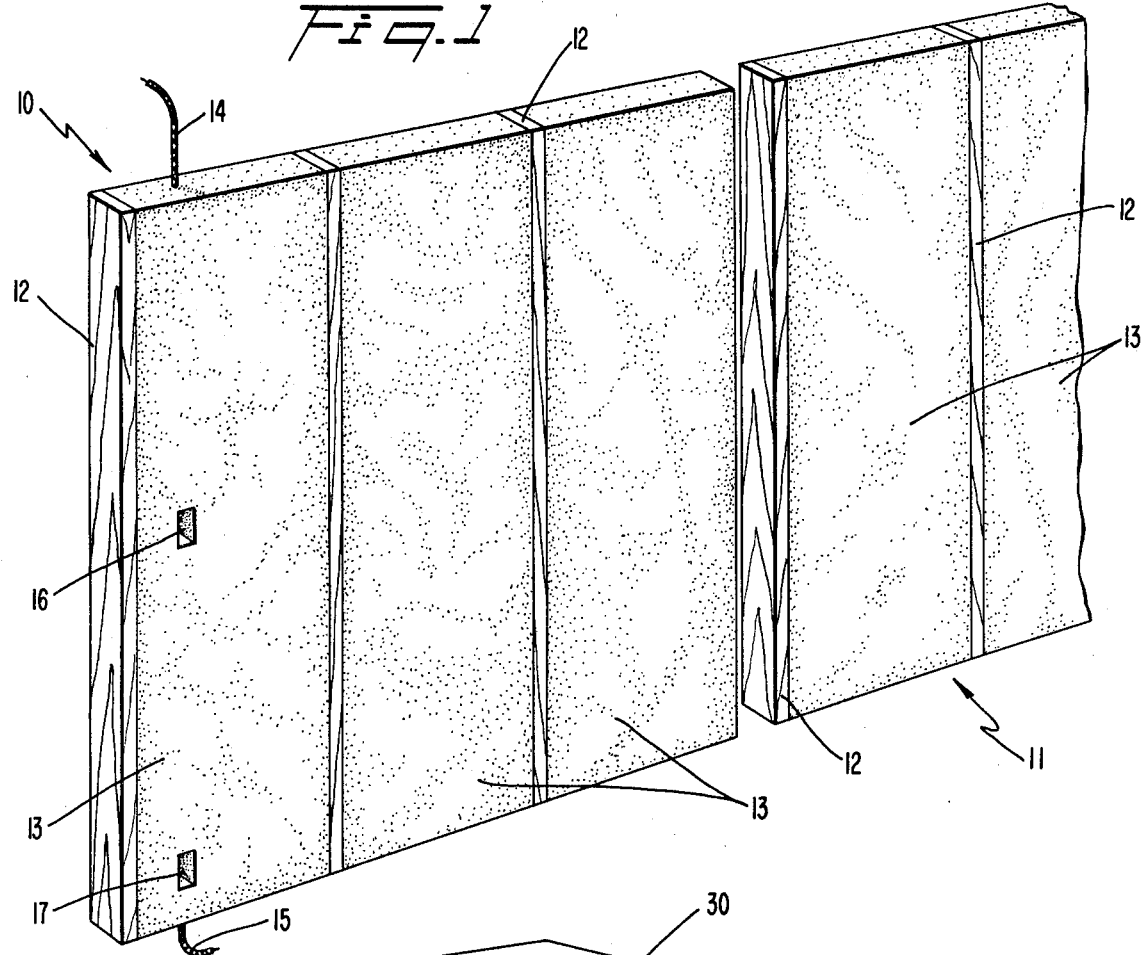
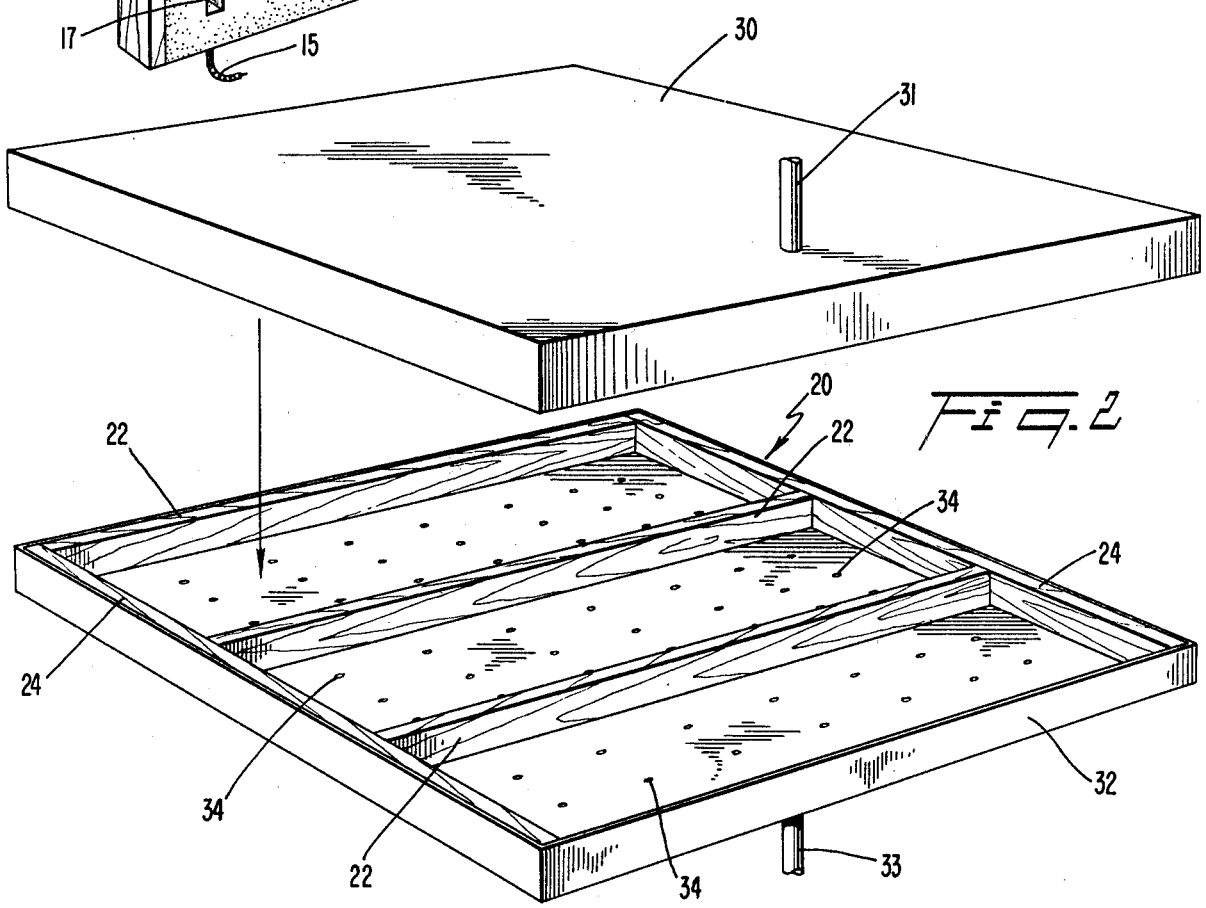

METHOD OF MAKING A FOAMED POLYSTYRENE BUILDING PANEL

TECHNICAL FIELD

This invention relates to a method for producing a building panel. More specifically, the invention relates to a prefabricated insulated building panel having frame members integrally bonded or fused to expanded polystyrene insulation.

BACKGROUND ART

It is well known to prefabricate building panels having rigid frame members and expanded foam material disposed therein. In these particular prior art processes, the frame members are first disposed in a particular way, adhesive material is applied to the frame members and foam is then placed within the frame structure contiguous to the adhesive material. In some processes, no adhesive material is used.

The field of prefabricated building panel construction is extremely crowded. An enormous amount of work has been done in this area of the building industry for cutting costs and maintenance. Many types of foamed plastic materials are known to be useful in the area of building panel construction with foamed polyurethane being most readily used. However, there are numerous disadvantages associated with this material, e.g., it is impossible to obtain a smooth continuous surface on polyurethane foamed with a nozzle. Thus, such foamed material must be cut and shaped in subsequent processing steps.

In U.S. Pat. No. 3,697,633, the frame interior is coated with an epoxy material which is different from the expanded polymer disposed therein. While the expanded polymer is setting, the exothermic heat is sufficient to soften the epoxy and thereby bond the expanded material to the epoxy coated frame members. In this particular process, polyurethane expanded through a conventional foam depositing nozzle provides the desired exothermic heat. The epoxy adhesive is activatible at the temperatures below the expansion temperatures of the polymer being used to fill the frame member. The resultant bond between the polyurethane and frame members has been found to be unsatisfactory.

In U.S. Pat. No. 3,258,889, a polyurethane material is sprayed and foamed within a frame in the conventional manner. The polyurethane foam is said to adhere tenaciously to the frame members. However, subsequent prior art has found it necessary to improve this structure by placing adhesive material on the frame members before spraying the polyurethane into place.

U.S. Pat. No. 3,736,715 discloses the use of a molded polystyrene sheet that is bonded to the frame members in a particular fashion using a peripheral casing assembly. A synthetic plastic adhesive is used to bond glass fiber fabric to the polystyrene sheet. This type of building panel requires considerable handling and construction in order to obtain desirable structural characteristics of a building panel.

U.S. Pat. No. 3,785,913 discloses a panel having an inner skin of material bonded to the outer surface of the frame members. Plastic foaming material such as urethane is then sprayed or poured on top of the inner skin in liquid form between the frame members. No adhesive is used on the frame members in this particular structure. A further layer of compressible material such as fiberglas is then placed on top of the foam. In other words, this foam material requires additional layers on the outside of the frame members to hold the material between the frame members in place. U.S. Pat. No. 3,159,882 shows a building panel having expanded polystyrene bonded to an outside covering for the panel structure.

U.S. Pat. No. 2,972,559 discloses a method of making laminated panels wherein adhesive material bonds an outer board to an expanded polystyrene core. A particular type of solvent adhesive is used to enhance the bond between the core material and the facing member or sheet.

U.S. Pat. No. 3,116,349 teaches a method of molding a laminate comprised of a layer of dense material bonded to a layer of foam styrene polymers without the use of an additional adhesive. Here, a complicated process of partially expanding beads, crushing particles and further subjecting the particles to heat for further expansion is required. There is no structure or process shown in this prior art wherein a rigid frame member can be satisfactorily bonded to a rigid frame member without the use of adhesive materials or some complicated combination of process steps.

U.S. Pat. No. 3,605,365 shows the use of a steam charged mold cavity wherein polystyrene beads may be expanded to form a shaped section. Suitable adhesives may be applied on hard surfaces for bonding during or after molding of the polystyrene beads. Panels of a sandwich type of construction are manufactured by expanding the polystyrene beads between two preshaped faces. The faces are precoated with a rubber or resin. The resultant building panel requires further expansion of the polymer at the building site. There are many attendant disadvantages associated with such a building panel construction.

Finally, for over thirty years, it has been known to unite polystyrene to other surfaces such as metal, glass, wood and the like, by applying a solvent which forms a sticky film on the solid body and then pressing the polystyrene against that film. U.S. Pat. No. 2,628,180 discloses the use of an adhesive composed of styrene monomer which is a very effective solvent for dissolving the expanded polystyrene body. An evaporation retarding material is added to the styrene monomer. The adhesive is then applied with a small syringe or an eye dropper to wet the assembly to which the polystyrene is to be attached.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a perspective view showing a first embodiment of a building panel made in accordance with my invention; and FIG. 2 is a perspective view of an assembly being used to form a second embodiment of a building panel made in accordance with this invention.

DETAILED DESCRIPTION

The building panels 10 and 11, made in accordance with this invention are shown in juxtaposition at the building site. Each panel 10 and 11 includes a plurality of frame members 12 that are integrally bonded to expanded polystyrene sections 13 therebetween. One end of the panel 10 does not have a frame member and is to be contiguously abutted to the first frame member 12 of the adjacent panel in the final construction of the wall being formed.

Building panel 10 includes a switch box that is molded directly into the expanded polystyrene material. An electrical line 14 goes to an overhead light. A wire and receptacle box 17 is also shown molded directly into the polystyrene section with the electrical line 15 going to a power source.

Panels 10 and 11 are to be placed on top of a bottom plate which is put in position on the foundation in a manner well known in the building art. Once panels 10 and 11 are contiguously abutted to each other, a header or top plate is secured across the ends of the vertically extending frame members 12 bonded to the polystyrene sections 13. Standard sheeting or wall panel may be placed on the inside and outside of the building construction as desired. These further building sheets or materials may be nailed directly to the frame members which are freely exposed along the lateral surfaces of building panels 10 and 11.

A second embodiment of a building panel 20 is shown in FIG. 2 at an intermediate point of its fabrication. Frame members 22 constitute the vertical struts of the panel to be formed. The upper and lower plate members 24 are integrally bonded to the expanded polystyrene along with the vertical components or struts 22. Frame members 22 are laterally spaced with respect to each other and have a dried coating of polystyrene disposed on at least one side thereof as discussed in more detail hereinbelow. Frame members 22 are substantially straight and disposed along the same plane and substantially parallel with respect to each other.

Frame members 22 constitute a first portion and frame plate members 24 constitute a second portion of all the frame members. The second portion is disposed transversely with respect to the frame members 22 of the first portion. Frame members 22 are substantially equal in length and frame members 24 are disposed along the ends of the frame members 22 to define rectangular areas therebetween. The dried coating side of each frame member 22 and 24 faces inwardly toward the rectangular area.

Frame members 12, 22 and 24 are composed of wood. It is possible that other material may be used to form building panels such as those shown herein. However, it is essential that a dried coating of liquid polystyrene material be disposed on every surface that is to be bonded to the finished expanded polystyrene section.

In preparation for the molding or heating step of the process of this invention, frame members 22 and 24 are pretreated so that at least one side thereof is coated with a liquid polystyrene. In one embodiment, the polystyrene is dissolved in a solvent such as ethyl acetate at ambient room temperature to produce the liquid styrene. The solid polystyrene may be in any form such as refuse or waste solid polystyrene that has been expanded or possibly unexpanded polystyrene. Any desirable solvent may be used to form a mixture of the liquid polystyrene.

It has been found that about a cubic foot of solid expanded polystyrene beads may be dissolved in a quart of ethyl acetate. This will give a consistency of a varnish material. Any desired mixture may be used which will form a coating of liquid polystyrene which may be dried thereon and be caused to fuse with the expanding polystyrene beads during the heating step of the process of this invention.

Frame members 22 and 24 are immersed into a bath of the mixture containing liquid polystyrene to form a thin liquid film thereover. The liquid coated frame members 22 and 24 are then allowed to dry to form a dried coating of the polystyrene over the entire frame member. It is clear that the liquid polystyrene mixture may be painted, sprayed, or applied in any other desirable manner. This coating may be dried up to about 24 hours before the frame members are actually placed in the mold cavity in preparation for the styrene expansion step.

An assembly as shown in the exploded perspective view of FIG. 2 may be used to form a building panel made in accordance with this invention. The assembly includes an upper cover 30 and a bottom section 32. Cover 30 and bottom section 32 may be hingedly connected or vertically disposed with respect to each other as desired. A steam inlet 31 is shown in the upper cover 30. Discharge outlet 33 extends from the bottom member 32.

When cover 30 and bottom member 32 are brought together, a mold cavity is formed therebetween. The cover member 30 has a plane surface that rests across the top of the frame members 22 and 24 so that there are several sections in the mold cavity defined within the rectangular areas between the frame members 22 and 24. Both cover 30 and bottom section 32 include injection openings 34 for introducing steam into the mold cavity. Drain or discharge openings (not shown) are interconnected with the discharge outlet 33 to eliminate any condensate formed during the process of this invention.

The panels of this invention are thus manufactured by expanding polystyrene beads placed in the rectangular areas defined between frame members 22 and 24. The planar facings used to form the upper and lower surfaces of the mold cavity are defined on the cover 30 and 32 with the steam injection openings 34 located therein. Thus, the expanded polystyrene sections between frame members 22 and 24 fill the mold cavity and have planar surfaces along the opposed lateral faces of the panel formed.

Once the styrene beads are placed within each rectangular area in the mold cavity, the cover 30 is brought into contact with the bottom 32 and steam is supplied to the mold cavity to effect the expansion of the expandable styrene beads. The steam is introduced into the mold cavity to heat the mold cavity to a temperature and for a time sufficient to expand the styrene beads in a manner well known in the prior art. That is, the specific manner of expanding styrene beads is well known and any desirable and available expandable bead may be used to form the building panel of this invention.

The dried polystyrene coating on frame members 22 and 24 is also affected by the use of the steam and caused to integrally form a bond with the expanding styrene beads that are contiguously disposed along the dried, coated surface. The wet heat of the steam is extremely advantageous. The closed cavity is subjected to a pressure of about 40 pounds per square inch while effecting the desired process. The styrene beads used in this particular embodiment are commercially available as STYROPOR and form a finished expanded polystyrene section having a density of about 1.1 pounds per cubic foot. The STYROPOR is in a bead form in a variety of sizes which will expand when exposed to proper heating conditions. They are expanded to the desired density with a pre-expander foam of 0.5 to 20 pounds per cubic foot. These beads are aged from 6 to 24 hours before molding into the panels of the instant application.

Once the mold cavity has been filled by the expanding polystyrene beads, the structure and mold cavity are cooled. The structure is cooled within the closed cavity to a temperature below the expanding temperature of the styrene beads. Once cooled, the cavity is opened and the expanded styrene is seen to be conformed to the planar surfaces of the mold cavity and integrally fused to the frame members 22 and 24. In one embodiment, the time for cooling the expanded polystyrene is about 8 minutes.

It is possible to build the panels of this invention to any kind of specification. This would include openings for windows, doors and any other type of material that could be molded or placed within the wall structure of a building.

While the polystyrene building panel and method of making same has been shown and described in detail, it is obvious that this invention is not to be considered as being limited to the exact form disclosed, and that changes in detail and construction may be made therein within the scope of the invention, without departing from the spirit thereof.

What is claimed is:

1. A process for producing a building panel having insulation material bonded to frame members, said process comprising the steps of:
   (a) applying a liquid film of polystyrene in solution on at least one side of a plurality of frame members which are substantially straight,
   (b) drying said liquid polystyrene film to form a dried coating of said polystyrene on said one side of each frame member,
   (c) placing said coated frame members along the same plane in a mold cavity with said dried coating side being faced inwardly toward said cavity,
   (d) placing expandable styrene beads in said mold cavity, and
   (e) heating said mold cavity at a temperature and for a time sufficient to expand said styrene beads and fill the cavity and cause the polystyrene coating on the frame member to integrally form a bond with the styrene beads expanding contiguously to said frame member.

2. The process as defined in claim 1 wherein
the liquid polystyrene is provided in a bath and the frame members are immersed in said bath to apply said film of liquid polystyrene.

3. The process as defined in claim 1 wherein
said cavity is completely closed during the heating step.

4. The process as defined in claim 1 wherein
said frame members are substantially parallel with respect to each other within said cavity.

5. The process as defined in claim 1 wherein
a first portion of the frame members is disposed substantially parallel with respect to each other, and
a second portion of the frame members is disposed transversely with respect to the frame members of said first portion.

6. The process as defined in claim 5 wherein
the frame members of said first portion are substantially equal in length and
said frame members of said second portion are disposed along the ends of the frame members of said first portion to define rectangular areas therebetween within said mold cavity,
said dried coating side of each frame member faces inwardly to said rectangular area, and
said styrene beads are placed within each rectangular area in said mold cavity.

7. The process as defined in claim 1 wherein
steam is supplied to said mold cavity to effect said heating step.

8. The process as defined in claim 1 wherein
the heated, expanded styrene beads are cooled within said closed cavity to a temperature below the expanding temperature of said styrene beads.

* * * * *